Figure 1:
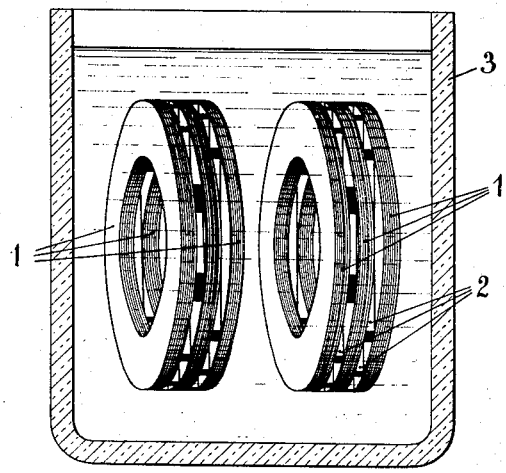

P. F. PICHON & A. MEISSNER.
FREQUENCY CONVERTER.
APPLICATION FILED JULY 19, 1913.

1,169,676.

Patented Jan. 25, 1916.

UNITED STATES PATENT OFFICE.

PAUL FERNAND PICHON AND ALEXANDER MEISSNER, OF BERLIN, GERMANY, ASSIGNORS TO GESELLSCHAFT FÜR DRAHTLOSE TELEGRAPHIE M. B. H., OF BERLIN, GERMANY.

FREQUENCY-CONVERTER.

1,169,676.  Specification of Letters Patent.  Patented Jan. 25, 1916.

Application filed July 19, 1913. Serial No. 780,037.

*To all whom it may concern:*

Be it known that we, PAUL FERNAND PICHON, a citizen of the French Republic, and ALEXANDER MEISSNER, a subject of the Austro-Hungarian Emperor, residing at Berlin, Germany, have invented certain new and useful Improvements in Frequency-Converters, of which the following is a full and clear specification, the particular novel features of my invention being more fully pointed out in the annexed claims.

The invention is illustrated in the accompanying drawing, which shows iron cores of the character described.

In building electric transformers a simple means is known to the art for reducing the iron losses due to eddy currents, by increasing the cross sectional area of the core. Thus other conditions being alike the induction per unit of area is thereby reduced. The losses per kilogram of iron, at least the principal losses due to eddy currents, decrease with the square of the induction, that is to say, at one half the induction per unit of area the eddy current losses are reduced to one-quarter. Owing to the increase of the total amount of iron to twice the amount, a decrease in eddy current losses is therefore obtained in the same proportion in which the weight of the iron employed increases per kilo-volt-ampere transmitted energy, in other words, with twice the amount of iron only one-half the loss is incurred.

In the construction of converters for converting the frequency of oscillating energy, in particular at high frequencies, it was of course obvious from the beginning to anyone skilled in the art that the chief difficulty to overcome in the construction resides in the reducing of the iron losses, which losses soon limit the efficiency of the entire arrangement which operates at a periodicity of from 5000 to 200,000 per second. To overcome these difficulties to a certain extent, the thickness of the sheet iron has been reduced as far as possible, which means is known in the art.

From the foregoing, however, it was obvious to also try the above described methods of increasing the cross sectional area of the iron core, so as to decrease the losses by increasing the iron volume per kw. This expedient has proven to be inefficient in case it is high frequencies which are concerned in the transformation. Experiments have shown, on the contrary, that it is necessary to considerably reduce the weight of the employed iron per kw transformed energy to a considerable extent, instead of increasing it as the experience in the art has heretofore taught. This appears to be surprising and contrary to known laws. Careful contemplation, supported by many experiments, has shown that the increase of the amount of iron can not help in this case, because it is not possible to reduce in such converters the induction per unit of area in the same degree as is done in ordinary transformers. On the contrary the working condition of frequency converters of the character employed by us demands the use of an induction in the core, which is so high that it is near the limit of magnetic saturation. If, therefore, the cross sectional area of the iron should be increased, as anyone skilled in the art would suggest immediately, the losses in our novel converter increase. Cores with such high saturation are chiefly employed in converters of the character shown and described, for instance, in the British Patent to Imray #11526 of 1911. Now according to our present invention, the total volume of the iron employed, instead of being increased is reduced to a minimum. How large the difference is between the relative amount of iron in ordinary transformers and in our novel converter may be best seen from the fact that in ordinary transformers, such as are employed in the electrical art, iron volumes of from two to ten kilograms are necessary for the transforming of one kilo-volt-ampere energy, whereas in converters of our construction for converting higher periodicities, according to the periodicity employed, iron volumes of at most one-half kilogram per kilo-volt-ampere transmitted energy are employed.

Owing to the unusual heating of the core artificial cooling is necessary. Oil cooling has proven to be most effective in this case. However, the ordinary transformer oil is not very well suited for this purpose, because it deteriorates after a short while, owing to the great heat. We have found, on the other hand, paraffin oil most effective of all.

The converter core may have any construction, so far as its form is concerned, which is desired.

Figure 2:
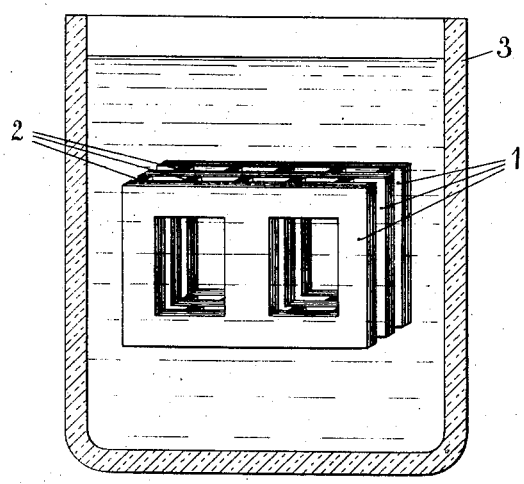

In the drawings,—Figure 1 shows a pair of iron cores specially adapted for the conversion of the frequency of energy; Fig. 2 shows a three-path core for a similar purpose.

In both figures 1 indicates an iron core divided into two or more parts separated from each other by insulating bars 2 or the like, each part being composed of sheet iron. The cores are lodged in vats 3 containing oil. By spacing apart the core sections as shown, vertical channels are formed through which the oil can freely rise for the purpose of better cooling the converter.

Claims:

1. An iron core for frequency converters being magnetically highly saturated and an iron volume relatively to the energy converted of not more than 0.5 kilogram per kilo-volt-ampere converted energy.

2. An iron core for frequency converters being magnetically highly saturated and an iron volume relatively to the energy converted of not more than 0.5 kilogram per kilo-volt-ampere converted energy, and means for cooling said core.

In testimony whereof we affix our signatures in presence of two witnesses.

PAUL FERNAND PICHON.
ALEXANDER MEISSNER.

Witnesses:
HENRY HASPER,
WOLDEMAR HAUPT.